US008645013B2

(12) United States Patent (10) Patent No.: US 8,645,013 B2
Sah et al. (45) Date of Patent: Feb. 4, 2014

(54) METHOD AND APPARATUS FOR DRIVELINE NOISE CONTROL IN A HYBRID POWERTRAIN

(75) Inventors: Jy-Jen F. Sah, West Bloomfield, MI (US); Lan Wang, Troy, MI (US); John A. Anderson, Farmington Hills, MI (US); James Sydenstricker, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 13/278,326

(22) Filed: Oct. 21, 2011

(65) Prior Publication Data

US 2013/0103234 A1 Apr. 25, 2013

(51) Int. Cl.
B60W 20/00 (2006.01)
B60W 10/02 (2006.01)
B60W 10/04 (2006.01)
B60K 6/00 (2007.10)

(52) U.S. Cl.
USPC ............................... 701/22; 701/51; 903/902

(58) Field of Classification Search
USPC ....................... 701/51, 22; 903/902
See application file for complete search history.

(56) References Cited

U.S. PATENT DOCUMENTS

| 5,640,322 | A * | 6/1997 | McCafferty et al. | 701/51 |
|---|---|---|---|---|
| 6,199,004 | B1 * | 3/2001 | Russell et al. | 701/54 |
| 7,917,275 | B2 * | 3/2011 | Doering et al. | 701/87 |
| 8,145,410 | B2 * | 3/2012 | Berger et al. | 701/111 |
| 8,239,113 | B2 * | 8/2012 | Doering et al. | 701/87 |
| 8,417,427 | B2 * | 4/2013 | Stridsberg | 701/51 |
| 2002/0133281 | A1 * | 9/2002 | Kotwicki et al. | 701/54 |
| 2007/0179695 | A1 * | 8/2007 | Reinke et al. | 701/54 |
| 2007/0213909 | A1 * | 9/2007 | Doering et al. | 701/54 |
| 2007/0213910 | A1 * | 9/2007 | Doering et al. | 701/54 |
| 2007/0225888 | A1 * | 9/2007 | Morris | 701/51 |
| 2007/0225889 | A1 * | 9/2007 | Morris | 701/53 |
| 2008/0257619 | A1 * | 10/2008 | Yamazaki | 180/65.2 |
| 2009/0062063 | A1 * | 3/2009 | Yamanaka et al. | 477/5 |
| 2010/0114424 | A1 * | 5/2010 | Morris et al. | 701/31 |
| 2011/0028269 | A1 * | 2/2011 | Park | 477/5 |
| 2011/0284336 | A1 * | 11/2011 | Soller et al. | 192/3.63 |
| 2012/0065848 | A1 * | 3/2012 | Neuberth et al. | 701/51 |
| 2012/0150399 | A1 * | 6/2012 | Kar et al. | 701/54 |
| 2012/0172175 | A1 * | 7/2012 | Nedorezov et al. | 477/169 |
| 2012/0255396 | A1 * | 10/2012 | Murata | 74/661 |
| 2012/0257763 | A1 * | 10/2012 | Bowden et al. | 381/71.4 |
| 2012/0310441 | A1 * | 12/2012 | Fukushiro | 701/1 |
| 2013/0054064 | A1 * | 2/2013 | Tamura et al. | 701/22 |
| 2013/0068056 | A1 * | 3/2013 | Van Batavia et al. | 74/335 |
| 2013/0073133 | A1 * | 3/2013 | Muta | 701/22 |
| 2013/0073134 | A1 * | 3/2013 | Yokouchi et al. | 701/22 |
| 2013/0096789 | A1 * | 4/2013 | McDonnell et al. | 701/54 |

* cited by examiner

*Primary Examiner* — Fadey Jabr
*Assistant Examiner* — Courtney Heinle

(57) ABSTRACT

A hybrid powertrain includes an engine and electric motors configured to transfer torque through a transmission. A method for controlling the hybrid powertrain includes determining a transition window associated with torque output of one of the electric motors coupled to an element of the transmission. A noise reduction control scheme is executed when the torque output of the one of the electric motors coupled to the element of the transmission is within the transition window.

10 Claims, 3 Drawing Sheets

METHOD AND APPARATUS FOR DRIVELINE NOISE CONTROL IN A HYBRID POWERTRAIN

TECHNICAL FIELD

This disclosure is related to hybrid powertrains.

BACKGROUND

The statements in this section merely provide background information related to the present disclosure. Accordingly, such statements are not intended to constitute an admission of prior art.

A hybrid transmission combines and transfers torque from various torque actuators to a drivetrain to provide tractive force for a vehicle. Torque actuators may include internal combustion engines and non-combustion machines including e.g., electric motors, hydraulic motors, and mechanical motors. Non-combustion machines may be controlled to generate torque or generate storable energy. For example, an electric motor may generate electricity that is immediately used in another electric motor or is remotely stored in a battery or high-voltage capacitor.

Paired electric motors may include a first motor configured to generate torque and a second motor configured to generate electricity. However, both the first and second motors may be capable of generating torque and electricity as required. Thus, during ongoing operation, the second motor may operate in a torque-generative mode to provide supplemental torque to the first motor to provide additional tractive force when torque demands are high.

Hybrid transmissions may utilize a differential gear set and clutches to manage torque between the torque actuators and the drivetrain. Through various clutch actuations the hybrid transmission may operate in one of several fixed gear modes or in a variable gear ratio mode. The differential gear arrangements typically include a sun gear, planetary gears, and a ring gear that meshingly engage and interact to transfer torque.

Each meshed gear interaction includes lash, i.e., a clearance that occurs between mating components of the gears. Lash has no effect when the gears are transferring torque. Lash may manifest itself in audible noise, e.g., as a rattle or clunk when the clearance between mating components of the gears is taken up during a torque transition. Torque transitions include initiating torque transfer from rest, stopping torque transfer during a coastdown, or reversing direction of torque transfer. Excessive lash is known to affect gear durability and cause torque transfer delays as the clearance between the mating components of the gears is taken up during a torque transition.

Audible noise associated with lash during a torque transition may be noticeable and objectionable when an electric motor reverses torque direction. Such audible noise may be generated by engine torque that is transferred to a transmission during torque reversal in an electric motor coupled to the transmission.

SUMMARY

A hybrid powertrain includes an engine and electric motors configured to transfer torque through a transmission. A method for controlling the hybrid powertrain includes determining a transition window associated with torque output of one of the electric motors coupled to an element of the transmission. A noise reduction control scheme is executed when the torque output of the one of the electric motors coupled to the element of the transmission is within the transition window.

BRIEF DESCRIPTION OF THE DRAWINGS

One or more embodiments will now be described, by way of example, with reference to the accompanying drawings, in which.

DETAILED DESCRIPTION

Figure 1:
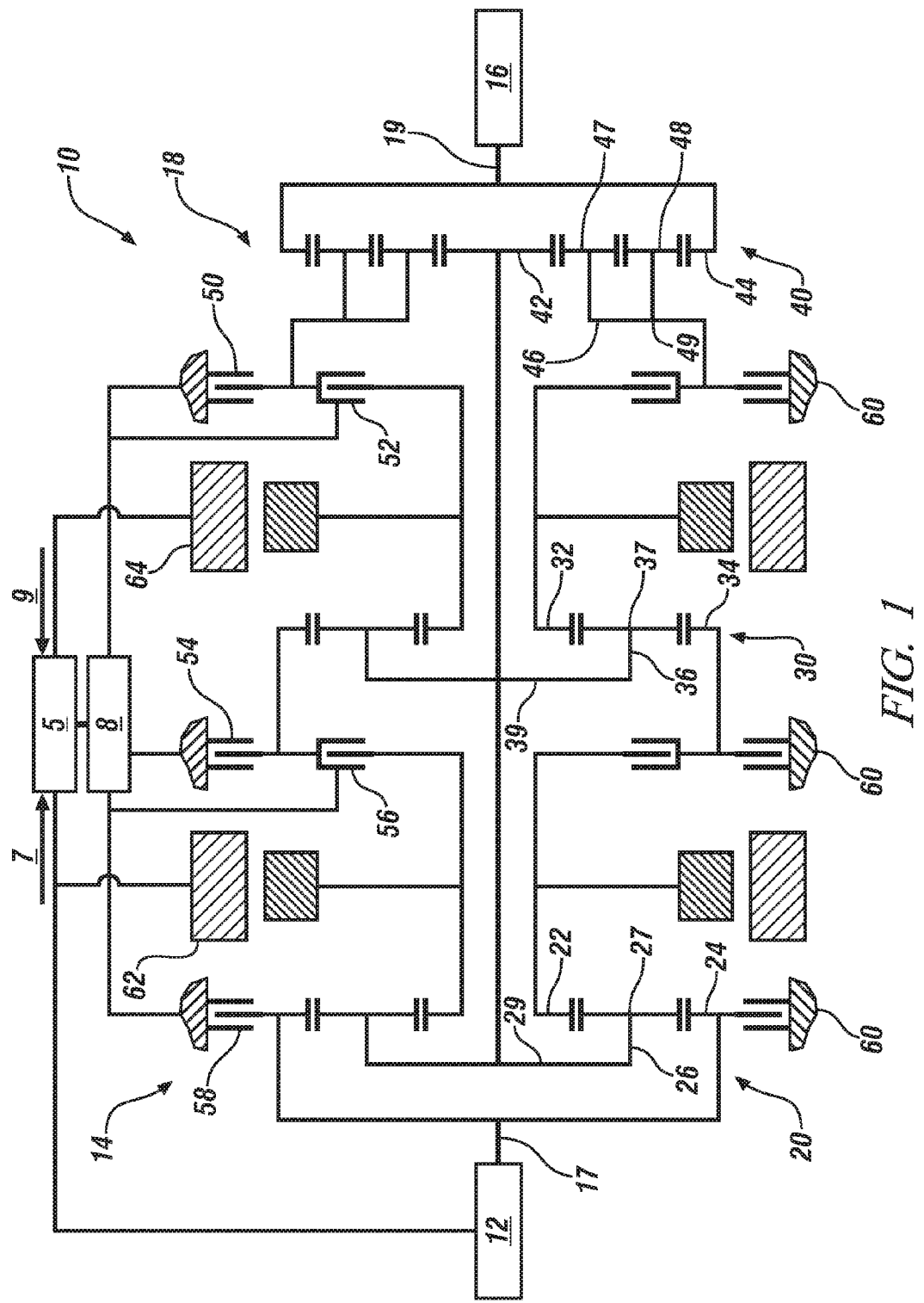
FIG. 1 schematically illustrates a hybrid powertrain system configured to provide tractive force for a vehicle, in accordance with the present disclosure.

Referring now to the drawings, wherein the showings are for the purpose of illustrating certain exemplary embodiments only and not for the purpose of limiting the same, FIG. 1 schematically illustrates a hybrid powertrain system 10 configured to provide tractive force to propel a vehicle. The hybrid powertrain system 10 includes a transmission 14 configured to interconnect an engine 12, a first motor 62, a second motor 64 and a differential 16. Like numerals refer to like elements throughout the description. The hybrid powertrain system 10 may be configured to operate as any one of a battery-electric system (EV), an extended-range electric system (EREV), an electric-hybrid system, or another configuration without limitation. The embodiment of the hybrid powertrain system 10 is illustrative.

The engine 12 is preferably a multi-cylinder direct fuel injection internal combustion engine that converts fuel to mechanical power through a combustion process. The engine 12 is equipped with a plurality of sensing devices and actuators configured to monitor operation and deliver fuel to form a combustion charge to generate torque. The engine 12 is configured to execute autostart and autostop control schemes and fuel cutoff (FCO) control schemes during ongoing operation of the hybrid powertrain system 10. The engine 12 is considered to be in an ON state when it is being fueled and is firing. The engine 12 is considered to be in an OFF state when it is not being fueled and is not spinning The engine 12 is considered to be in an FCO state when is not being fueled but is spinning The first and second motors 62 and 64, respectively, preferably include multi-phase electric motor/generators electrically connected to an inverter module. The first and second motors 62 and 64, respectively, are configured to operate in torque-generative modes to convert stored electric energy to mechanical power and in electric power generating modes to convert mechanical power to electric energy storable in an energy storage device. The first and second torque motors 62 and 64 have limitations in power outputs in the form of torque and rotational speeds.

The planetary transmission 14 includes an input shaft 17 continuously coupled with the engine 12, a planetary gear arrangement 18, and an output shaft 19 continuously coupled with the differential 16. A torque converter may be positioned between the engine 12 and the input shaft 17. If no torque converter is present, a vibration isolator may be positioned between the engine 12 and the input shaft 17. The exemplary planetary gear arrangement 18 includes three planetary gear sets including a first planetary gear set 20, a second planetary gear set 30, and a third planetary gear set 40.

The first planetary gear set 20 includes a sun gear member 22, a ring gear member 24, and a planet carrier assembly member 26. The planet carrier assembly member 26 includes a plurality of pinion gears 27 rotatably mounted on a carrier member 29 that interact with both the sun gear member 22 and the ring gear member 24.

The second planetary gear set 30 includes a sun gear member 32, a ring gear member 34, and a planet carrier assembly member 36. The planet carrier assembly member 36 includes a plurality of pinion gears 37 rotatably mounted on a carrier member 39 that interact with both the sun gear member 32 and the ring member 34.

The third planetary gear set 40 includes a sun gear member 42, a ring gear member 44, and a planet carrier assembly member 46. The planet carrier assembly member 46 includes a plurality of pinion gears 47, 48 rotatably mounted on a carrier member 49. The pinion gears 47 interact with the sun gear member 42 and the pinion gears 48. The pinion gears 48 interact with the ring gear member 44 and the pinion gears 47. The third planetary gear set 40 is commonly referred to as a compound planetary gear set.

The first motor 62 and second motor 64 are integrated to the transmission to convert between electrical energy and mechanical energy. The first motor 62 is coupled to the transmission 14 at the sun gear member 22 and selectively coupled to ring member 34 as explained below. The second motor 64 is coupled to the transmission 14 at the sun gear member 32 and selectively coupled to the planet carrier assembly member 46 as explained below. The first and second motors 62, 64 are able to provide torque to the transmission 14 independently or in combination with each other and the engine 12.

The exemplary planetary gear arrangement 18 includes five selectable torque transmitting clutches 50, 52, 54, 56, and 58. The torque transmitting clutches 52 and 56 are any suitable rotating-type torque transmitting mechanisms, and are commonly multi-plate clutch devices arranged in a friction configuration. The torque transmitting clutches 50, 54 and 58 may be any suitable stationary-type torque transmitting mechanisms, and commonly termed brake or reaction clutches, and may be a selectable one-way clutch (SOWC) that may be a controllable mechanical diode clutch, a selectable roller clutch, or a selectable sprag clutch design.

The input shaft 17 is continuously coupled with the ring gear member 24 and the output shaft 19 is continuously coupled with the ring carrier member 29. The ring gear member 22 is selectively connectable with the carrier member 29 through activation of the clutch 58. The first motor 62 is selectively connectable with the ring gear member 34 through activation of the clutch 56. The ring gear member 34 is selectively connectable with the transmission housing 60 through activation of the clutch 54. The second motor 64 is selectively connectable with the planet carrier assembly member 46 through activation of the clutch 52. The planet carrier assembly member 36 is selectively connectable with the transmission housing 60 through activation of the clutch 50.

The transmission 14 includes a series of fluid circuits for routing fluid to appropriate areas of the transmission 14. The fluid circuits supply hydraulic pressure to apply individual ones of the clutches 50, 52, 54, 56, and 58. A hydraulic fluid delivery system 8, commonly referred to as a valve body, is signally connected to a control module 5 to selectively open and close a number of valves to provide selectable fluid flow into the desired fluid circuit(s) to activate and deactivate the individual clutches 50, 52, 54, 56, and 58 to create the commanded outcome, e.g., an appropriate torque multiplication or reduction.

The control module 5 operatively connects to the valve body 8 to activate and deactivate the clutches 50, 52, 54, 56, and 58. The control module 5 signally and operatively connects to each of the engine 12, the first motor 62, and the second motor 64. The control module 5 monitors an operator torque request 7 and powertrain operating parameters 9, e.g., current engine torque output, wheel speed sensor output, and gear selection, to select appropriate motor output and clutches 50, 52, 54, 56, and 58 to achieve a selected gear ratio for operation. The selected gear ratio may be selected from a series of look-up tables or computed based on the operator torque request 7 and the powertrain operating parameters 9.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The control module 5 monitors the operator torque request 7 and the powertrain operating parameters 9. The control module 5 calculates a preferred torque output required from each of the engine 12, first motor 62, and second motor 64 in conjunction with a preferred gear selection to control operation of the hybrid powertrain system 10 to generate tractive torque in response to the operator torque request 7. For example, the control module 5 may select operation in an EV mode wherein the first and second motors 62, 64 operate in torque-generative modes to provide torque output and the engine 12 is in the OFF state. The control module 5 may select operation in a combustion mode wherein only the engine 12 generates tractive torque and the first and second motors 62, 64 operate in electric power generating modes. The control module 5 may select operation in a combination mode wherein the engine 12 and one or both the first and second motors 62, 64 operates in the torque-generative mode.

In one embodiment, the engine 12 and the first motor 62 are primarily employed to generate tractive torque with the second motor 64 is employed to generate electric power. At low levels of torque demand, the first motor 62 is employed to generate tractive torque and the engine is in the OFF state in one embodiment. When the torque demand exceeds an operating threshold, the second motor 64 switches from operating in the electric power generating mode to operating in the torque-generative mode. The operating threshold, for example, may be triggered by an increase in the operator torque request 7 that exceeds a torque capacity of the first motor 62, or a change in operating efficiencies of the first and second motors 62, 64. It is appreciated that the second motor 64 transitions from operating in the torque-generative mode to operating in the electric power generating mode, with a corresponding effect upon meshed interactions of select gear members of the first, second and third first planetary gear sets 20, 30, and 40, respectively.

When the second motor 64 transitions between the electric power generating mode and the torque-generative mode and its direction of torque is reversed, associated meshed interactions are reversed and lash is taken up as the meshed gears reverse direction. During the transition between the electric power generating mode and the torque-generative mode, audible noise may be generated when the second motor 64 changes direction of torque and lash is taken up in the meshed interactions of select gear members during the torque transition. Vibrations associated with torque transfer from the engine 12 through the input shaft 17 to the gear members of the planetary transmission 14 may exacerbate the audible noise generated by the lash being taken up in the meshed gears. The objectionable audible noise produced may be amplified through the transmission housing 60.

Figure 3:
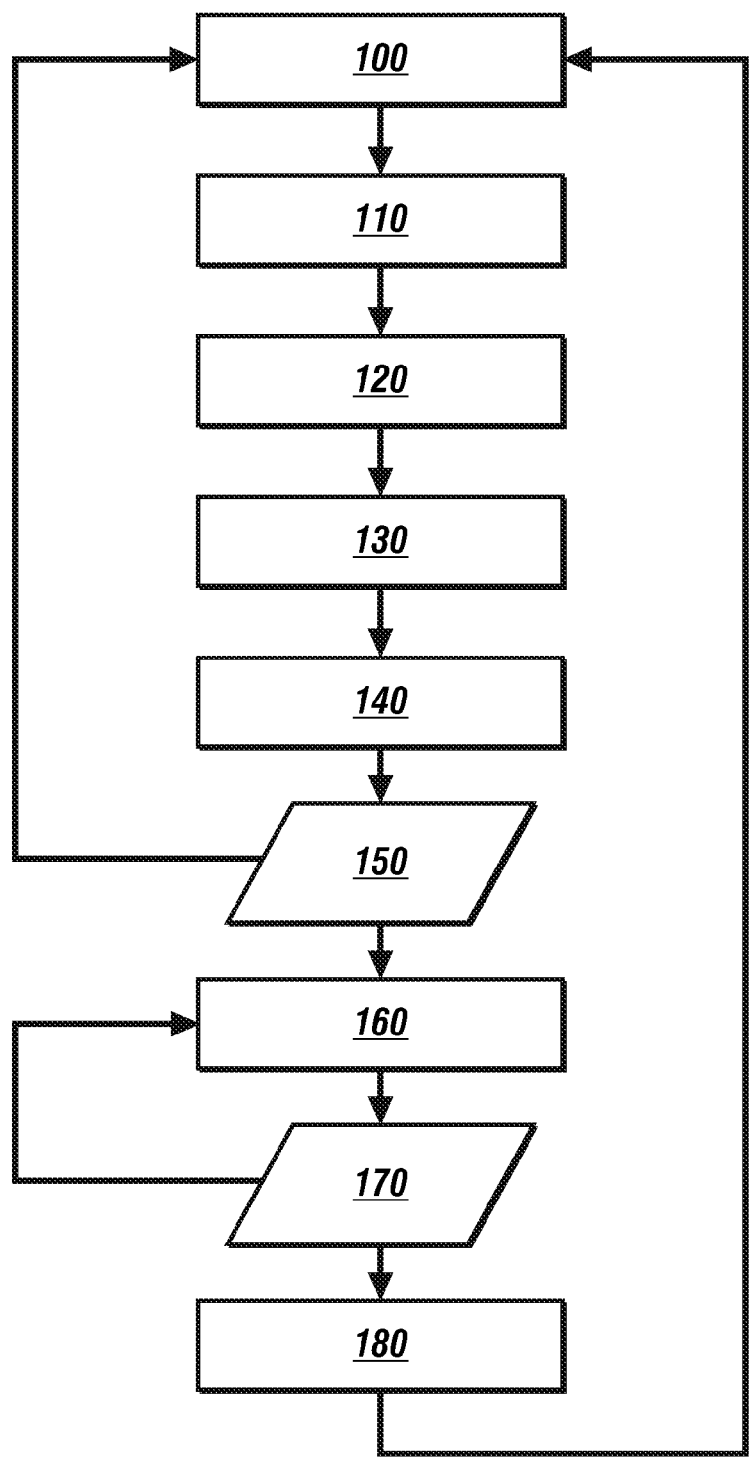
FIG. 3 schematically illustrates an exemplary flow diagram of a noise prevention control scheme to control operation of a hybrid powertrain system, in accordance with the present disclosure.

FIG. 3 is a flowchart for a noise prevention control scheme for controlling and managing operation of a powertrain system in response to an operator torque request to minimize or prevent audible noise caused by gear lash that occurs with a change in operation of an electric motor from generating torque in a first direction to generating torque in a second direction. The noise prevention control scheme is described with reference to the hybrid powertrain system 10 described with reference to FIG. 1.

Table 1 is provided as a key to FIG. 3 for the flow diagram of the noise prevention control scheme wherein the numerically labeled blocks and the corresponding functions are set forth as follows.

TABLE 1

| BLOCK | BLOCK CONTENTS |
| --- | --- |
| 100 | Monitor engine torque output |
| 110 | Monitor first motor torque output |
| 120 | Monitor second motor torque output |
| 130 | Monitor clutch activations |
| 140 | Determine boundaries of transition window |
| 150 | Determine when one of the first and second motors is operating within the transition window |
| 160 | Execute noise reduction control scheme |
| 170 | Determine when the one of the first and second motor is operating outside of the transition window |
| 180 | Discontinue noise reduction control scheme |

The noise prevention control scheme monitors torque outputs of the engine (100), the first electric motor (110), and the second electric motor (120). Activations of the clutches of the transmission are monitored (130).

Boundaries for transition windows for the first and second electric motors are determined (140). Each transition window is related to positive and negative torque values around a transition point of zero torque output for the selected electric motor. The transition point is defined as the point at which the electric motor is generating zero torque, and indicates a point at which the electric motor changes between generating torque in a first direction to generating torque in a second direction. Thus, a change between operating in the electric power generating mode and operating in the torque-generative mode includes a transition point.

A transition window is an interval related to the transition point. As the direction of torque output from the electric motor is reversed, associated meshed interactions in the transmission are reversed. Lash is taken up as the meshed gears begin transferring torque in the other direction. The transition window is associated with the take up of lash in the meshed interactions of select gear members during torque transition, as torque transfer in a first direction is offloaded from the meshed gears and torque transfer in a second, reverse direction is applied to the meshed gears by changing the operating mode of the electric motor. The transition window may be defined in terms of positive and negative torque values of the motor around the transition point of zero torque. The boundaries for the transition windows are preferably predetermined and stored using look-up tables. One having ordinary skill in the art is able to determine suitable magnitudes of positive and negative torque values around a transition point of zero torque that accounts for take up of lash. In one embodiment, the transition window may instead be one-sided, and be defined as the transition point of zero torque and one of the positive and negative torque values of the motor around the transition point of zero torque, wherein the one of the positive and negative torque values of the motor around the transition point of zero torque corresponds to torque transfer in the second, reverse direction that is applied to the meshed gears at the end of the transition.

The torque outputs of the first electric motor (110) and the second electric motor (120) are monitored to determine when either the first electric motor or the second electric motor is operating within its corresponding transition window (150). The torque outputs of the first electric motor (110) and the second electric motor (120) may be monitored using torque commands for the first and second electric motors. Determining whether either the first electric motor or the second electric motor is operating within the transition window may be accomplished using look-up tables and operating parameters including the operator torque request, motor torque commands motor speeds, or other related operating parameters.

A noise reduction control scheme is executed when either the first electric motor or the second electric motor is operating within the transition window (160). In one embodiment, the noise reduction control scheme includes a process that includes decoupling the transitioning electric motor from the transmission during the transition window by deactivating one or more clutches that effect torque transfer between the electric motor and the transmission. This operation is graphically depicted with reference to FIG. 2. In one embodiment, decoupling the transitioning electric motor from the transmission during the transition window allows for the geared interactions in the transmission to be reversed without a mechanical connection between the transitioning electric motor and the transmission housing, thereby reducing the transfer of noise through the transmission housing associated with lash transition. The deactivated clutches are reactivated after the lash is taken up.

Alternatively, the noise reduction control scheme includes building up a torque reserve from the engine and providing a torque release to quickly reverse all the meshed interactions at once during the transition window. The torque reserve is created by increasing a throttle opening to the engine and retarding spark upon entering the transition window. The engine immediately increases torque generation to take up the lash in the transmission by advancing the retarded spark at the end of the transition window after the second electric motor has transitioned between operating in the electric power generating mode and operating in the torque-generative mode. This operation causes an immediate lash take-up in the reversed direction of the second motor. The clutches preferably remain engaged. Such operation may include a single audible click as all the lash is taken up at once, which may be considered less objectionable than a longer rattle or growl noise.

Alternatively, the noise reduction control scheme includes decreasing the amount of torque produced by the engine and increasing the torque of the second motor to provide an immediate torque generation to compensate for the reduction of torque from the engine. The immediate increase in torque from the second motor reverses the gear direction to take up the lash of each of the gear interactions during the transition window. The clutches preferably remain engaged. Such operation may include a single audible click as all the lash is taken up at once, which may be considered less objectionable than a longer rattle or growl noise.

A single one or all the noise prevention control schemes may be employed on a single vehicle. It will be apparent that any reduction in torque output by the engine or first motor during the transition may be supplemented by the other, i.e., the engine or the first motor.

Operation of the affected electric motor is monitored, and the noise reduction control scheme is subsequently discontinued when the affected electric motor exits the transition window (170). The powertrain system resumes normal operation thereafter to transmit torque between the first and second electric motors, the engine, and the transmission in response to the operator torque request (180).

As is appreciated, the noise reduction control scheme operates during a transition of one of the electric motors between an electric power generating mode and a torque-generative mode. It will be further appreciated that although the second motor is discussed in detail, the methods herein may be equally applied to the first motor.

Figure 2:
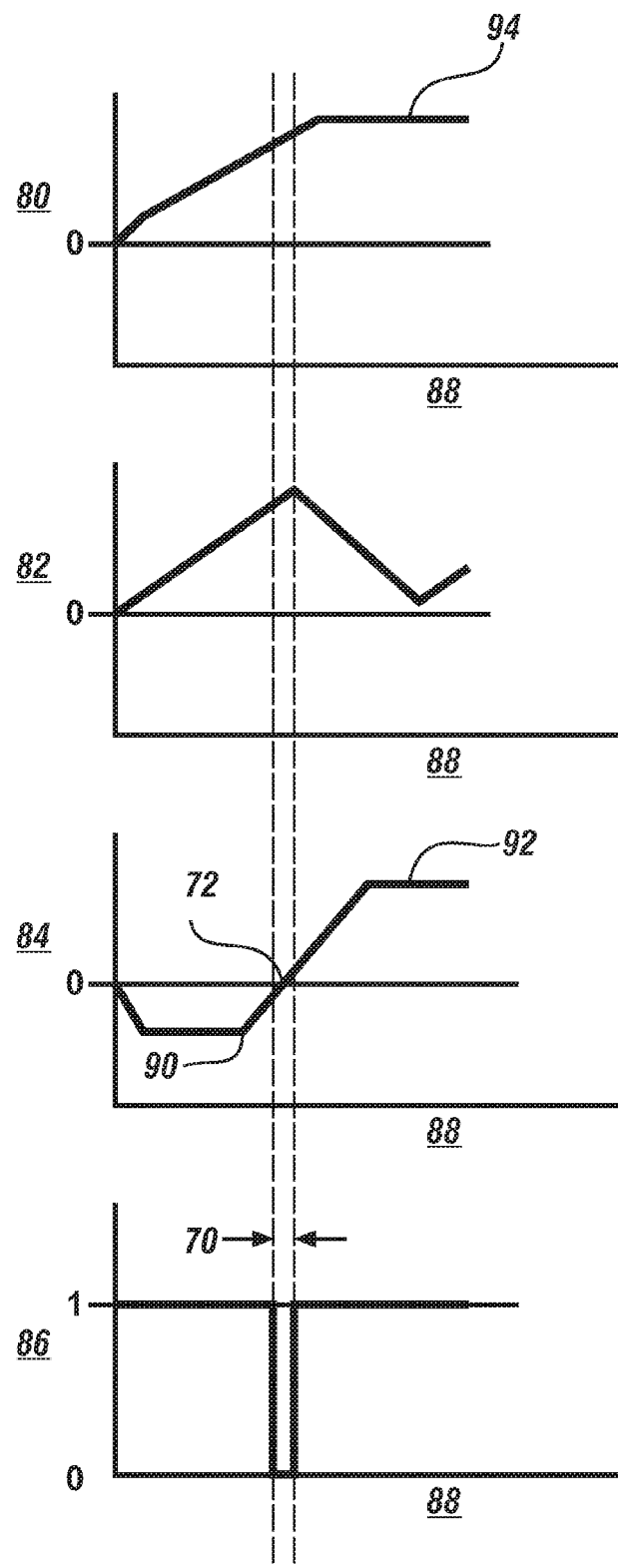
FIG. 2 graphically shows coincident magnitudes of engine torque, a first motor torque, a second motor torque, and a corresponding clutch activation associated with operation of a powertrain system during execution of an exemplary noise prevention control scheme, in accordance with the disclosure.

FIG. 2 graphically shows coincident magnitudes of engine torque 80, first motor torque 82, and second motor torque 84 and a corresponding clutch activation command 86 in relation to elapsed time 88. The engine torque 80, first motor torque 82, second motor torque 84 and corresponding clutch activation command 86 are associated with operation of a powertrain system, e.g., the hybrid powertrain system 10 including transmission 14, engine 12, first motor 62, and second motor 64 described with reference to FIG. 1. The clutch activation command 86 is associated with clutch 54, which is a stationary-type torque transmitting mechanism. The magnitudes of engine torque 80, first motor torque 82, and second motor torque 84 are in response to an operator torque request for tractive power.

Initially, the powertrain system is generating zero torque. In response to an operator torque request, the engine torque 80 and the first motor torque 82 increase. A portion of the generated torque is consumed by the second motor torque 84, which is indicated by operation in the electric power generating mode.

The second motor torque 84 subsequently begins increasing and approaches a transition point 72 and transition window 70 that are associated with transitioning between operating in the electric power generating mode and operating in the torque-generative mode. It is appreciated that the transition point 72 and transition window 70 occur with mode transitions in either direction. Lash occurs in specific ones of the gears of the transmission 14 as the motor transitions between generating electric power and generating tractive torque, with an attendant risk of creating objectionable noise. The transition window 70 is associated with lash that must be taken up in conjunction with offloading torque in the gears in a first rotational direction and applying torque in the gears in a second, opposite rotational direction.

The transition point 72 may be determined by calculating an estimated rate of torque reduction to reach the transition point 72 or by using predetermined look-up tables. The transition window 70 may be determined to be a time period or a torque range prior to and subsequent to the transition point 72. The transition window 70 may be determined as a torque range surrounding the transition point 72, a speed range around the speed of the affected motor at the torque transition point 72, a time period estimated to accomplish the noise reduction, or another suitable engine operating parameter.

The engine torque 80 increases from zero through the transition window 70 and achieves a peak torque value 94 after the transition window 70. The first motor torque 82 increases from zero to a peak torque output at approximately the end of the transition window 70 then decreases to a point close to zero before again increasing torque.

The transition point 72 and corresponding transition window 70 are shown for the second torque motor as it transitions from generating electric power to generating tractive torque. Prior to the beginning of the transition window 70, the state of the clutch activation command 86 is 1, indicating the associated clutch 54 is activated. During the transition window 72, the clutch activation command 86 shifts to 0, indicating the associated clutch 54 is deactivated, permitting the lash to be taken up in the gears of the transmission 14 as the second motor transitions from generating electric power to generating tractive torque. Subsequently, the operation continues with the second motor generating tractive torque.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a hybrid powertrain including an engine and electric motors configured to transfer torque through a transmission, comprising:
   determining a transition window associated with torque output of one of the electric motors coupled to an element of the transmission during a transition between an electric power generating mode and a torque-generative mode of said one of the electric motors; and
   executing, by a controller, a noise reduction control scheme when the torque output of the one of the electric motors coupled to the element of the transmission is within the transition window comprising decoupling the one of the electric motors from the element of the transmission when the torque output of the electric motor is within the transition window.

2. The method of claim 1, wherein said transition window is associated with take up of lash in the transmission occurring during said transition between the electric power generating mode and the torque-generative mode.

3. The method of claim 1, wherein decoupling the electric motor from the element of the transmission comprises deactivating a clutch element configured to effect torque transfer between the one of the electric motors and the element of the transmission when the torque output of the one of the electric motors coupled to the element of the transmission is within the transition window.

4. Method for controlling a hybrid powertrain including an engine and an electric motor coupled to a transmission, comprising:
- determining a transition window associated with torque output of the electric motor coupled to the transmission during a transition between an electric power generating mode and a torque-generative mode of said one of the electric motors; and
- executing, a controller, a noise reduction control scheme when the torque output of the electric motor is within the transition window comprising decoupling the electric motor from the element of the transmission when the torque output of the electric motor is within the transition window.

5. The method of claim 4, wherein said transition window is associated with said transition between the electric power generating mode and the torque-generative mode.

6. The method of claim 5, wherein said transition window is associated with take up of lash in the transmission occurring during said transition between the electric power generating mode and the torque-generative mode.

7. The method of claim 4, wherein decoupling the electric motor from the element of the transmission comprises deactivating a clutch element configured to effect torque transfer between the electric motor and the element of the transmission when the torque output of the electric motor is within the transition window.

8. Method for controlling noise generation in a hybrid powertrain including an engine and first and second electric motors configured to transfer torque through a transmission to a driveline, comprising:
- determining a transition window associated with take up of lash in the transmission occurring during transitioning the second electric motor between operating in an electric power generating mode and operating in a torque-generative mode; and
- executing, a controller, a noise reduction control scheme when the torque output of the second electric motor is within the transition window comprising decoupling the second electric motor from the element of the transmission when the torque output of the second electric motor is within the transition window.

9. The method of claim 8, wherein decoupling the second electric motor from the element of the transmission comprises deactivating a clutch element configured to couple the second electric motor to a transmission case of the transmission when the torque output of the second electric motor is within the transition window.

10. The method of claim 8, wherein executing the noise reduction control scheme when the torque output of the second electric motor is within the transition window comprises:
- decreasing an amount of torque produced by the engine and increasing the torque of the second motor during operation in the transition window; and
- transitioning the second electric motor between operating in an electric power generating mode and operating in a torque-generative mode, and subsequently immediately increasing amount of torque produced by the engine to take up the lash.

\* \* \* \* \*